(12) United States Patent  
Wilhite

(10) Patent No.: US 8,055,610 B2  
(45) Date of Patent: Nov. 8, 2011

(54) APPARATUS, SYSTEM, AND METHOD FOR PROCESSING MDX POST-ORDER HIERARCHIZE EXPRESSIONS

(75) Inventor: David G. Wilhite, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 12/241,944

(22) Filed: Sep. 30, 2008

(65) Prior Publication Data

US 2010/0082525 A1     Apr. 1, 2010

(51) Int. Cl.
    *G06F 7/00*          (2006.01)
    *G06F 17/00*       (2006.01)

(52) U.S. Cl. ........................................ 707/600

(58) Field of Classification Search ............... 707/601
See application file for complete search history.

(56) References Cited

U.S. PATENT DOCUMENTS

| | | | | |
|---|---|---|---|---|
| 5,528,508 | A * | 6/1996 | Russell et al. | 716/52 |
| 6,567,815 | B1 * | 5/2003 | Rubin et al. | 1/1 |
| 6,978,271 | B1 * | 12/2005 | Hoffman et al. | 1/1 |
| 7,165,216 | B2 * | 1/2007 | Chidlovskii et al. | 715/237 |
| 7,895,216 | B2 * | 2/2011 | Longshaw et al. | 707/752 |
| 2005/0102294 | A1 * | 5/2005 | Coldewey | 707/100 |
| 2008/0154860 | A1 * | 6/2008 | Chen et al. | 707/3 |

OTHER PUBLICATIONS

MSDN. "Hierarchize (MDX) SQL Server 2005". Jul. 17, 2006. http://msdn.microsoft.com/en-us/library/ms145981(d=printer,v=SQL.90).aspx, pp. 1-3. Accessed Jun. 6, 2011.*

Aho et al., "Data Structures and Algorithms", Chapter 3: Trees, Copyright 1983 by Bell Telephone Laboratories, Inc., Reprinted with corrections Apr. 1987.

* cited by examiner

*Primary Examiner* — Kimberly Lovel
*Assistant Examiner* — Michael Pham
(74) *Attorney, Agent, or Firm* — Kunzler Needham Massey & Thorpe

(57) ABSTRACT

Disclosed are an apparatus, system, and method for generating a post-order set of members referenced by an MDX query statement invoking a post-order function. The apparatus includes an input module that receives the MDX expression specifying the relevant data set. A pre-order module generates a set of the members in pre-order organization. An initialization module generates an empty post-order set and inserts the first member of the pre-order set into the post-order set. An ancestor module determines whether the next member in the pre-order set has an ancestor in the post-order set and the location of the closest ancestor of the member if it exists. An insertion module then inserts the member immediately before the closest ancestor if the ancestor exists, or puts it in the rightmost position of the post-order set if an ancestor does not exist. An iteration module invokes the ancestor and insertion modules for each member of the pre-order set until the post-order set is filled.

5 Claims, 2 Drawing Sheets

Dimension 210

Pre-ordered set 212 → {2007 7H1 7H2 2008 8H1 8Q1 8Q2 8H2 8Q3 8Q4}

Post-ordered set 214a → {2007}

214b → {7H1 2007}

214c → {7H1 7H2 2007}

214d → {7H1 7H2 2007 2008}

214e → {7H1 7H2 2007 8H1 2008}

214f → {7H1 7H2 2007 8Q1 8H1 2008}

214g → {7H1 7H2 2007 8Q1 8Q2 8H1 2008}

214h → {7H1 7H2 2007 8Q1 8Q2 8H1 8H2 2008}

214i → {7H1 7H2 2007 8Q1 8Q2 8H1 8Q3 8H2 2008}

Post-ordered set 214j → {7H1 7H2 2007 8Q1 8Q2 8H1 8Q3 8Q4 8H2 2008}

APPARATUS, SYSTEM, AND METHOD FOR PROCESSING MDX POST-ORDER HIERARCHIZE EXPRESSIONS

BACKGROUND OF THE INVENTION

1. Field of the Invention

The invention relates to creating a set in post-order organization from a set originally in pre-order organization. More specifically, the invention relates to generating a post-order organization of the result set of an MDX query that is in pre-order organization.

2. Description of the Related Art

Online analytical processing (OLAP) is a valuable resource for interpreting and understanding raw data in new and meaningful ways. OLAP also allows this data to be accessed in a more efficient manner and is a valuable resource in business intelligence.

OLAPs generally store data in data cubes, which are specified as a set of dimensions such as time, customer, and product. Each dimension can be further divided into a set of ordered levels. For example, the time dimension may include levels for years, and each level includes dimension members such as 2004, 2005, 2006, 2007, and 2008. These dimension members may be further organized hierarchically within the dimension; thus, the year 2004 has four children (quarters 1 through 4) and each child may have further children (for example, quarter 1 has children January, February, and March).

The MDX query language has become a standard for query language in the OLAP environment, and is used for multiple OLAP APIs, including OLE DB for OLAP, XML for Analysis, and ADOMD.NET. MDX allows a user to access information in the data cubes, much like SQL allows access to information in relational tables. For example, an MDX query may specify:

```
Select [Time].members on columns,
       [Measures].members on rows,
From [SalesCube]
Where [Product].[Food]
```

This query returns a two dimensional result set with a full list of members along the x-axis and a full list of measures associated with the cube along the y-axis. The data represented in the result set specifies the combination of time and measure members on the axes as specified. For example, the result set may read:

|        | 2006 | 6Q1 | 6Q2 | 6Q3 | 6Q4 | 2007 | 7Q1 | 7Q2 | 7Q3 | 7Q4 |
|--------|------|-----|-----|-----|-----|------|-----|-----|-----|-----|
| Sales  | 500  | 100 | 100 | 100 | 200 | 600  | 200 | 100 | 100 | 200 |
| Qty    | 10   | 2   | 2   | 3   | 3   | 20   | 4   | 4   | 6   | 6   |
| Profit | 100  | 10  | 20  | 30  | 40  | 200  | 40  | 50  | 50  | 60  |

The results shown above are listed in pre-order, meaning that the dimension member will appear in the resulting ordered list before any of its descendants. Thus, 2006 appears before its children, the quarters 6Q1, 6Q2, 6Q3, and 6Q4. If additional granularity were presented (say, at the month level), the pre-order list would specify: 2006, 6Q1, January, February, March, 6Q2, April, May, June, etc. . . .

The MDX query language supports a function named "hierarchize." The hierarchize function places members of the dimension into hierarchical order in a pre-order format. The hierarchize function receives as a parameter a relevant set of data from the data cube, and puts members of that set into pre-order form as shown in the table above.

However, many users require data to be presented in post-order hierarchize form. Post-order hierarchize form means that the dimension member will appear in the resulting list or set after all of its descendants. Thus, the list: 6Q 1, 6Q2, 6Q3, 6Q4, 2006, 7Q1, 7Q2, 7Q3, 7Q4, 2007, is in post-order form where 6Q1 represents the first quarter of 2006, 6Q2 represents the second quarter, and so on. Again, if the granularity were at the month level, the list or set would be ordered: January, February, March, 6Q1, April, May, June, 6Q2, July, August, September, 6Q3, October, November, December, 6Q4, 2006.

Since the hierarchize operation is essentially an ordering operation on members of a set, the most efficient approaches (whether pre- or post-order) are order (n log n), where n is the number of members in the set to be ordered. Accordingly, a need exists for generating a post-order list or set of members from a pre-ordered set that preserves the (n log n) order. Ideally, such a solution does not require the storage of additional information such as identifiers to facilitate the post-order arrangement of members.

SUMMARY OF THE INVENTION

The present invention has been developed in response to the present state of the art, and in particular, in response to the need for efficiently generating a post-order set from a pre-order set.

In one embodiment, the present invention is a method for generating a post-ordered set from a pre-ordered set of data derived from a data cube in a database management system (DBMS) implementing an online analytical processing (OLAP) system. The method includes receiving a multidimensional expression (MDX) query statement that invokes a post-order hierarchize function and that specifies a set of data from a data cube as a parameter. The set of data comprises one or more hierarchically-related members.

The method also includes generating a pre-order set of the hierarchically-related members from the set of data by executing a pre-order hierarchize function on the set of data such that the pre-order set is organized in pre-order form. The method also involves generating a post-order set and inserting a first member of the pre-order set into the post-order set in response to determining that the post-order set is empty.

Next, the method includes determining whether a member of the pre-order set has an ancestor in the post-order set and determining the location in the post-order set of the member's closest ancestor. The member is inserted into the post-order set in response to a determination of the existence an ancestor and the location of the closest ancestor in the post-order set. The member of the pre-order set is inserted into a rightmost position of the post-order set in response to determining that the next member has no ancestor in the post-order set. The method also includes iterating the steps of determining whether the member has a ancestor in the post-order set and inserting the member in the post-order set for every member of the pre-order set.

Also disclosed is an apparatus that has an input module, a pre-order module, an initialization module, an ancestor module, an insertion module, and an iteration module for performing the steps disclosed above.

In one embodiment, the apparatus stores member id values organized in depth-first order for each of the members in the set of data to facilitate the pre-order module generating the post-order set. The apparatus does not store additional information to facilitate generation of the post-order set from the pre-order set.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
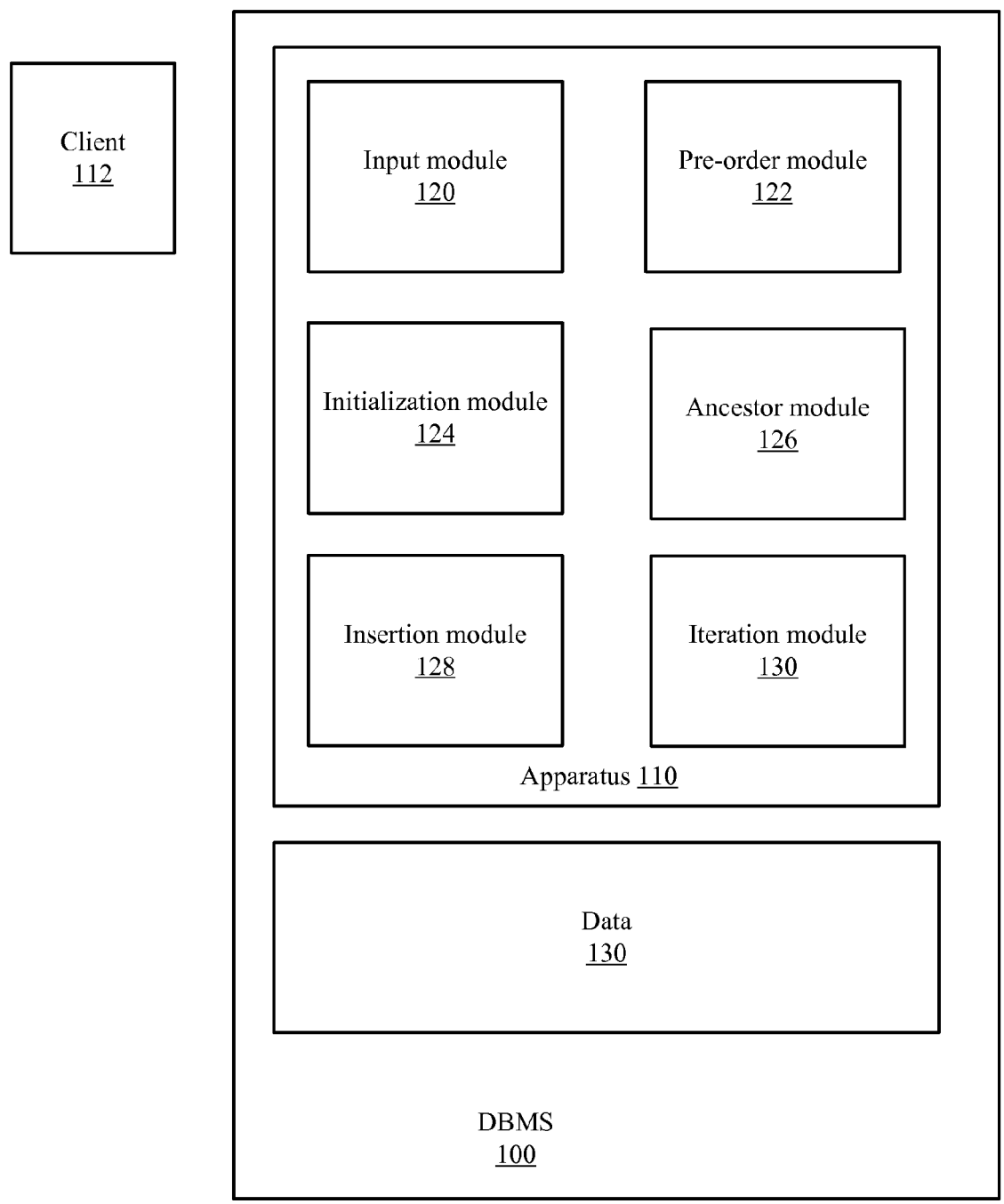
FIG. 1 is a schematic block diagram illustrating a system for implementing an apparatus for performing post-order hierarchize operations specified in an MDX expression.

It will be readily understood that the components of the present invention, as generally described and illustrated in the figures herein, may be arranged and designed in a wide variety of different configurations. Thus, the following more detailed description of the embodiments of the apparatus of the present invention, as represented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module. In embodiments where the present invention includes modules, these modules are stored in computer readable storage medium. Those of skill in the art will appreciate that a computer readable storage medium is any physical medium which can store information readable by a computer. Examples include memory in its various forms (Flash, PROM, etc) and in medium such as CDs, DVDs, Bernoulli drives, and others well-known in the art.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates one embodiment of a system for implementing an apparatus 110 that performs post-order hierarchize operations in response to an MDX query statement. The system includes a client 112 and a database management system (DBMS) 100. The client 112 may be a human user, a computer, or a program that is running as part of the DBMS 100. In short, the client 112 may be any entity that sends MDX queries to a DBMS 100.

The DBMS 100 includes data 130 and the apparatus 110. The DBMS 100, in one embodiment, is a data warehouse implementing an OLAP system. For example, the DBMS 100 may be IBM's DB2 Data Warehouse Edition product. The OLAP system may be realized in a number of different configurations, such as relational OLAP (ROLAP), multidimensional OLAP (MOLAP), or a hybrid OLAP (HOLAP). The data 130 may be stored and organized in a number of different ways known to those of skill in the art depending on how the OLAP system is realized. Generally, the data 130 accessible using the OLAP paradigm is organized in cubes. The manner in which the cubes are organized may vary based on factors such as whether the system is implemented as a ROLAP or a MOLAP.

The apparatus 110 provides post-order operations on data in a set when it receives an MDX query from a client 112 that invokes its services. In one embodiment, the apparatus 110 is stored in memory on the DBMS 100. The apparatus 110 includes an input module 120, a pre-order module 122, an initialization module 124, an ancestor module 126, and an insertion module 128.

The input module 120 receives an MDX query statement that invokes a post-order hierarchize function and specifies a set of data from a data cube (stored in data 130) that is the subject of the post-order hierarchize operation. The set of data may be listed as a parameter of the function. As discussed above, the set of data comprises one or more members that are hierarchically related. The input module 120 appropriately parses the MDX query and determines that the post-order hierarchize operation is being invoked. In other embodiments, the input module 120 receives a set of data to be placed in post-order. This set of data may be unordered, in pre-order, or ordered in another manner.

For example, a client 112 may provide the input module 120 with an MDX query statement in the following form:

```
Select hierarchize ([Time].members, POST) on columns,
    Hierarchize ([Measures].members) on rows
From [SalesCube]
Where [Product].[Food]
```

The MDX query may specify the entire dimension as the set of data, or may identify only subsets of the dimension; thus, the present invention works equally well for statements that identify the entire structure or for statements that identify only portions of the dimension (and thus only portions of the tree) as the set that is subject to the post-order hierarchize operation.

The apparatus 110 also includes a pre-order module 122 that generates a pre-order set from the set of data specified in the MDX query statement. In one embodiment, the pre-order module 122 invokes a pre-order hierarchize function and executes this function on the set of data to generate a set of data in pre-order form. In one embodiment, the pre-order module 122 invokes native functions for providing a pre-ordered set. For example, in DB2, when a cube dimension is populated, each member of the dimension is assigned a numeric identifier in depth first order. This member id assignment corresponds to the pre-order hierarchize order; as a result, when the members are ordered by the member ids, they naturally fall into pre-ordered form.

In certain embodiments, the apparatus 110 does not include the pre-order module 122. Similarly, an apparatus 110 including the pre-order module 122 may not invoke the pre-order processing functionality provided by the pre-order module 122. For example, in situations where the input set is already in pre-order, the pre-order module 122 may not be invoked. In certain embodiments, the apparatus 110 may determine whether the input set is in pre-order condition prior to invoking the pre-order module 122.

With the data set in pre-order form, the apparatus 110 reorders the pre-order set to put it into post-order form without storing additional information (such as new member ids) to facilitate the reordering process. The initialization module 124 generates an empty set to hold the members in post-order form. The initialization module 124 then inserts a first member of the pre-order set into the post-order set if the post-order set is empty.

The ancestor module 126 determines whether a member of the pre-order set has an ancestor in the post-order set. If the member has an ancestor in the post-order set, the ancestor module 126 determines the location of the closest ancestor in the post-order set. If there is only one ancestor in the set, then that ancestor is, of course, the closest ancestor in the set. If the member has multiple ancestors in the set, the closest ancestor is the one with the fewest generations between it and the member. For example, a parent ancestor is closer than a grandparent, and a grandparent is closer than a great-grandparent.

If the member has an ancestor in the post-order set, the insertion module 128 then inserts the member in the position immediately before the closest ancestor in the post-order set. If the member does not have an ancestor in the post-order set, the insertion module inserts the member in a rightmost position of the post-order set.

As a result, the ancestor module 126, in combination with the insertion module 128, places the member in the correct position in a non-empty set. The iteration module 130 invokes the ancestor module 126 and the insertion module 128 for each member in the pre-order set. This iterative process proceeds from left to right through each member in the pre-order set. Thus, once the apparatus 110 has moved through each member of the pre-order set, a second set will have been created that has the members organized in post-order fashion.

Figure 2:
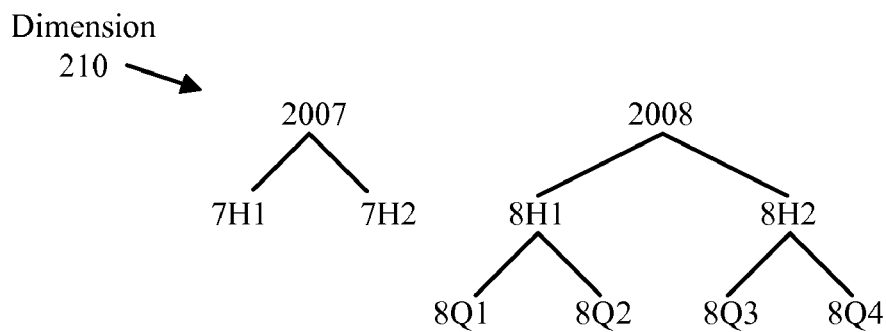
FIG. 2 is an example of creating a post-order hierarchize set from a pre-order hierarchized set.

FIG. 2 shows one example of the apparatus 110 generating a post-order set in accordance with the present invention. Dimension 210 shows hierarchically-related members that may be subject to a hierarchize operation. The member 2007 has two children, 7H1 (representing the first half of 2007) and 7H2 (representing the second half of 2007). The 2008 member similarly has two children 8H1 and 8H2. Each child, in turn, has two children (such as 8Q1 and 8Q2) representing the two quarters that make up that half of the year. There is also a root member of the dimension 210 that is not shown.

In accordance with the present invention, the input module 120 receives an MDX query specifying the data set comprising the members of the dimension 210 and requesting that the members be organized in post-order. The pre-order module 122 generates the pre-order set 212 of the dimension 210. The initialization module 124 creates an initially empty post-order set 214. Because the post-order set 214 is empty, the initialization module 124 inserts the first member of the pre-order set 212 (which is the 2007 member) into the post-ordered set 214. As a result, the post-ordered set 214 is as shown at 214a.

The iteration module 130 then invokes the ancestor module 126 and the insertion module 128 for the next member (7H1) in the pre-ordered set 212. The ancestor module 126 determines that the member 7H1 has an ancestor in the post-order set (2007) and determines the location of the ancestor in the post-ordered set 214. The insertion module then inserts the 7H1 member in the position immediately before its ancestor in the post-ordered set 214, as shown at 214b. Substantially the same process places the next member (7H2) immediately before 2007 on the next iteration, as shown in 214c.

When the 2008 member is selected, the ancestor module 126 determines that the 2008 member does not have an ancestor in the post-ordered set 214. As a result, the insertion module 128 inserts the 2008 member in the rightmost position of the post-order set 214 as shown at 214d. Next, the 8H1 member, being a child of 2008, is placed immediately before 2008 as explained above and the post-ordered set is as shown at 214e.

When the 8Q1 element is selected, the ancestor module 126 determines that the 8H1 member is the closest ancestor (as between 8H1 and 2008, both of which are ancestors). The insertion module 128 inserts the 8Q1 element immediately before 8H1 as shown at 214f. The same process places 8Q2 immediately before 8H1 at 214g. When the 8H2 element is reached, the ancestor module 126 determines that its closest ancestor in the post-order set 214 is 2008, and the insertion module 128 inserts it immediately before 2008 as shown at 214h. The process continues until each member of the pre-ordered set 212 is accounted for and placed appropriately in the post-ordered set 214. The final post-order set 214 is shown at 214j.

While in the example above the pre-ordered set 212 includes all the members of the dimension 210, the present invention works equally well with a subset of the members of the dimension 210. For example, if the set included only the members at the second level of the dimension 210 (i.e., 7H1, 7H2, 8H1, and 8H2) or only the members at the quarter level, the present invention works equally well. Thus, the present invention can successfully order partial sets in addition to the full set.

In certain embodiments, the present invention can also be used equally well outside of a database and datacube environment. The method more generally applies to any scenario where post-hierarchical ordering of hierarchically-related members is required. Thus, in certain embodiments, the input module receives a data set of hierarchically-related members and the apparatus 110 places those members in post-hierarchical order. In such embodiments, the apparatus 110 may be implemented independent of MDX query statements or any particular environment such as a DBMS 100.

Listed below is pseudo code for one implementation of an apparatus in accordance with the present invention. Those of skill in the art will appreciate that the code below is one manner of implementing the present invention, and that the present invention is not limited to any particular implementation.

```
Pseudo-Code receive MDX expression of form hierarchize (set, POST)
create set2 = hierarchize (set)
create an empty list of members ll
create an iterator axisSetIterator over set
create an iterator llIterator over the list ll
while (axisSetIterator.hasNext( ) ) {
    set current = axisSetIterator.next( )
    if (llIterator.hasNext( )) {
        set at = llIterator.next( )
        set found = false
        if (at is an ancestor of current in the hierarchy) {
            /* go left until it is not an ancestor */
            while (llIterator.hasPrevious( )) {
                at = llIterator.previous( )
                if (at is not an ancestor of current in the hierarchy) {
                    set found = true
                    break
                }
            }
            if (found) {
                /* forward iterator to add it after this one */
                llIterator.next( )
            }
            llIterator.add(current)
        }
```

```
Pseudo-Code else {
            /* keep going right until it is an ancestor */
            while (llIterator.hasNext( )) {
                at = llIterator.next( )
                if (at is an ancestor of current in the hierarchy) {
                    found = true
                    break
                }
            }
            if (found) {
                /* rewind the iterator to add it before this one */
                llIterator.previous( )
            }
            llIterator.add(current)
        }
    }
    else {
        llIterator.add(current)
    }
    llIterator.previous( ) /* make the newly added one the next one */
}
```

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for generating a post-ordered set from a pre-ordered set of data derived from a data cube in a database management system (DBMS) implementing an online analytical processing (OLAP) system, wherein the pre-ordered set is presented such that a dimension member will appear in a resulting ordered list before any of the dimension member's descendants and the post-ordered set is presented such that a dimension member will appear in the resulting ordered list after all of the dimension member's descendents, the apparatus comprising:
a non-transitory computer readable storage medium;
an input module configured to receive a multidimensional expression (MDX) query statement that invokes a post-order hierarchize function and that specifies a set of data from a data cube as a parameter of the post-order hierarchize function, wherein the set of data comprises one or more hierarchically-related members;
a pre-order module configured to generate a pre-order set of the hierarchically-related members from the set of data by executing a pre-order hierarchize function on the set of data such that the pre-order set is organized in pre-order form;
an initialization module configured to generate a post-order set and to insert a first member of the pre-order set into the post-order set in response to determining that the post-order set is empty;
an ancestor module configured to determine whether a member of the pre-order set has an ancestor in the post-order set, the ancestor module further configured to determine a location in the post-order set of a closest ancestor of the member;
an insertion module configured to, insert the member of the pre-order set into the post-order set, in a position immediately before the closest ancestor, in response to the ancestor module determining the location of the closest ancestor of the member; and insert the member of the pre-order set into a rightmost position of the post-order set in response to the ancestor module determining that the member has no ancestor in the post-order set; and an iteration module configured to invoke the ancestor module and the insertion module for every member of the pre-order set.

2. The apparatus of claim 1, wherein the apparatus stores member id values organized in depth-first order for each of the members in the set of data to facilitate the pre-order module generating the pre-order set, and wherein the apparatus stores no additional information to facilitate generation of the post-order set from the pre-order set.

3. The apparatus of claim 1, wherein the DBMS is a data warehouse and the OLAP system is one of a relational OLAP (ROLAP), a multidimensional OLAP (MOLAP), and a hybrid OLAP (HOLAP).

4. A method for generating a post-ordered set from a pre-ordered set of data derived from a data cube in a database management system (DBMS) implementing an online analytical processing (OLAP) system, wherein the pre-ordered set is presented such that a dimension member will appear in a resulting ordered list before any of the dimension member's descendants and the post-ordered set is presented such that a dimension member will appear in the resulting ordered list after all of the dimension member's descendents, the method comprising:

receiving, by a computer, a multidimensional expression (MDX) query statement that invokes a post-order hierarchize function and that specifies a set of data from a data cube as a parameter of the post-order hierarchize function, wherein the set of data comprises one or more hierarchically-related members;

generating, by a computer, a pre-order set of the hierarchically-related members from the set of data by executing a pre-order hierarchize function on the set of data such that the pre-order set is organized in pre-order form;

generating, by a computer, a post-order set and inserting a first member of the pre-order set into the post-order set in response to determining that the post-order set is empty;

determining, by a computer, whether a member of the pre-order set has an ancestor in the post-order set and determining a location in the post-order set of a closest ancestor of the member;

inserting, by a computer, the member of the pre-order set into the post-order set in a position immediately before the closest ancestor, in response to determining the location of the closest ancestor of the member;

inserting, by a computer, the member of the pre-order set into a rightmost position of the post-order set in response to determining that the member has no ancestor in the post-order set; and iterating, by a computer, the steps of determining whether the member has a ancestor in the post-order set and inserting the member in the post-order set for every member of the pre-order set.

5. The method of claim 4, wherein the DBMS is a data warehouse and the OLAP system is one of a relational OLAP (ROLAP), a multidimensional OLAP (MOLAP), and a hybrid OLAP (HOLAP).

* * * * *